United States Patent [19]

Ballendux

[11] 4,305,308
[45] Dec. 15, 1981

[54] SIDE MOUNTED TRANSMISSION SHIFTING MECHANISM

[75] Inventor: Gerardus M. Ballendux, Waukesha, Wis.

[73] Assignee: Allis-Chalmers Corporation, Milwaukee, Wis.

[21] Appl. No.: 105,634

[22] Filed: Dec. 20, 1979

[51] Int. Cl.³ .......................... G05G 9/18; G05G 5/10
[52] U.S. Cl. ..................................... 74/473 R; 74/477
[58] Field of Search ..................... 74/473 R, 475, 477

[56] References Cited

U.S. PATENT DOCUMENTS 3,364,793 1/1968 Eastwood .......................... 74/477 X
3,365,972 1/1968 Luke et al. ........................ 74/473 X
3,916,717 11/1975 Heintz ............................... 74/473 R
3,975,970 8/1976 Elfes et al. ........................ 74/473 R

FOREIGN PATENT DOCUMENTS 400907 8/1924 Fed. Rep. of Germany .... 74/473 R
25917 of 1905 United Kingdom ............. 74/473 R Primary Examiner—Allan D. Herrmann
Attorney, Agent, or Firm—Arthur L. Nelson

[57] ABSTRACT

A side mounted transmission shifting mechanism having a lever pivotally connected for reciprocating and pivoting a crank arm on the crankshaft to shift a vehicle transmission. The crank arm selectively engages one of a plurality of shift rails to selectively shift the transmission.

10 Claims, 3 Drawing Figures

SIDE MOUNTED TRANSMISSION SHIFTING MECHANISM

This invention relates to the transmission shifting mechanism and more particularly to a side mounted transmission shifting mechanism having a shift lever mounted in the cradle and pivotally connected to a shaft having a crank arm to pivotally engage shift rails for shifting a vehicle transmission.

Normally vehicle transmissions are mounted centrally on the vehicle chassis and extend rearwardly under the operator station. If the operator sits in the middle of the cab with the transmission immediately under the seat, it is inconvenient to have the shift lever centrally located at the operator station since the operator is positioned at this location. Accordingly, linkages have been provided from the center to a shift lever at the side of the seat for the convenience to the operator in shifting the transmission, which may be directly under the operator's station. Accordingly, this invention provides an optimum positioning of a shift lever on the vehicle by mounting the shifting mechanism on the side of the vehicle transmission. The shift rails and the shifting forks are mounted in the transmission and a shaft with a crank arm extends internally of the transmission from the side to selectively engage one of the plurality of shift rails. Accordingly, the shifting of the transmission is accomplished through controlling the shift lever on the side of the transmission which selectively shifts the transmission through a plurality of speed ranges provided on the transmission. The connection between the shift lever and the shift fork is a direct connection through a shaft and crank arm to engage the shift rail and provides a solid feel for the operator in determining the shift position of the vehicle transmission.

It is an object of this invention to provide a side mounted shifting mechanism on a vehicle transmission for shifting a crank arm, which selectively shifts the vehicle transmission.

It is another object of this invention to provide a side mounted shifting mechanism on a vehicle transmission having a reciprocal and pivotal crank shaft for selectively shifting the vehicle transmission.

It is a further object of this invention to provide a side mounted shift lever on a vehicle transmission operating a crankshaft having a crank arm and mounted for reciprocal and pivotal movement while selectively shifting the transmission. The crankshaft carries a cradle which pivotally supports the shift lever and is pivotally connected to the shift lever to reciprocate the crankshaft and crank arm for selecting a shift rail and pivotal movement of the shift lever will pivot the crank arm to shift the transmission to the selected speed ratio.

The objects of this invention are accomplished through a side mounted shifting mechanism which includes a cradle carried on the shaft having a crank arm. The lever is pivotally connected to the shaft for reciprocating shaft relative to the cradle and for rotating the cradle and shaft for pivot through a pivotal connection of the lever and shaft. Reciprocal movement of the crankshaft and crank arm provides the selection of the one of the plurality of shift rails while pivotal movement of the lever and crank arm provides a pivotal movement of the crank arm to shift the selected shift rail to provide shifting of the vehicle transmission.

Referring to the drawings, the preferred embodiment of this invention is illustrated.

Figure 1:
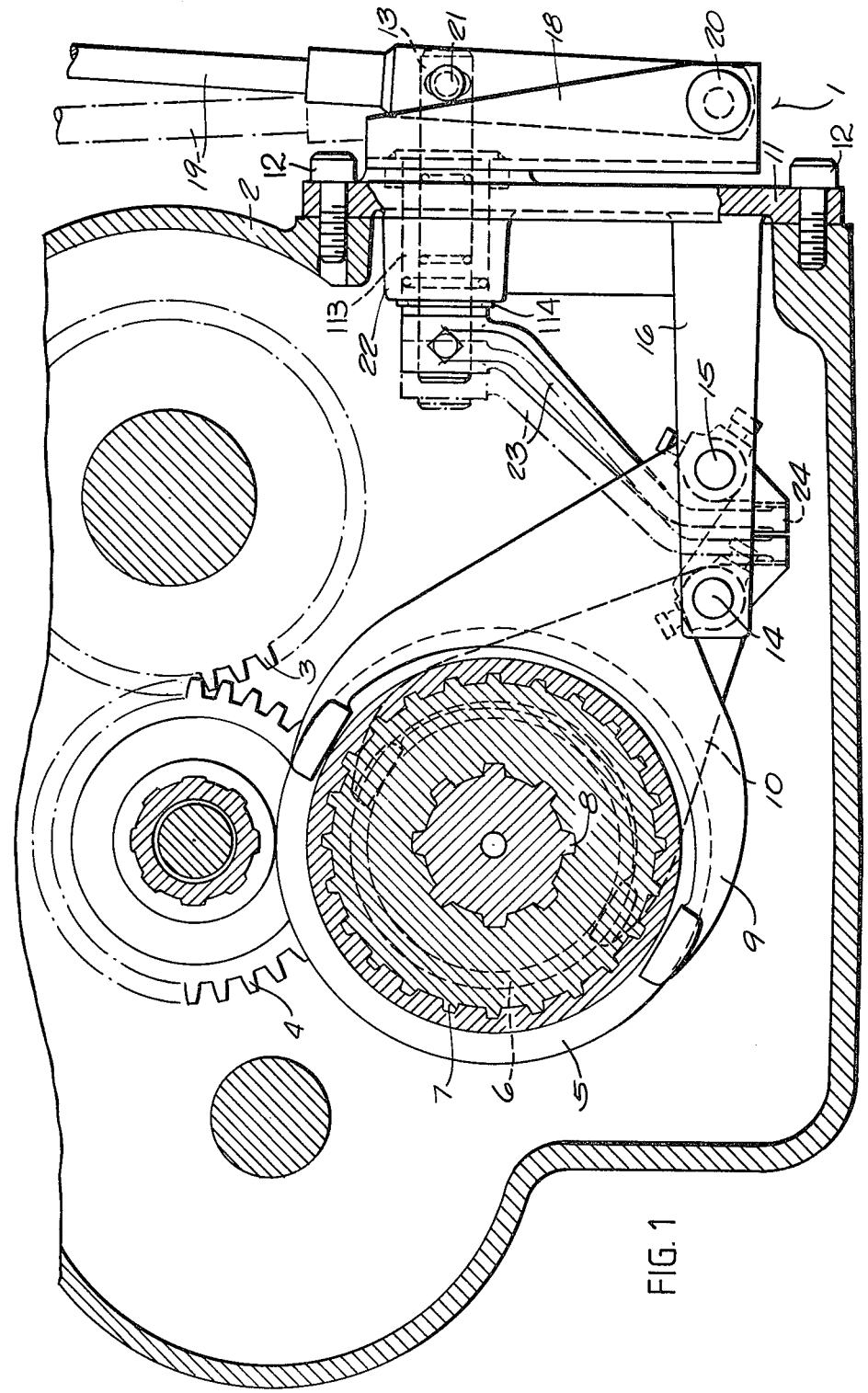
FIG. 1 shows a cross-section view of the transmission showing the side mounted shifting mechanism.

Referring to the drawings, FIG. 1 shows a cross-section view of the side mounted shifting mechanism 1 mounted on the side of the transmission housing 2. The gears 3 and 4 drive through the clutch sleeves 5 and 6 which are slidable on the mating splines 7 and 8. The clutch sleeves are moved by the shift forks 9 and 10 responsive to manual shifting of the transmission. The side plate 11 is fastened by a plurality of bolts 12 on the side of the housing 2. The side plate 11 supports the hollow shaft 113 and the shift rails 14 and 15 which are supported in the rail supports 16 and 17. The rails carry the shift forks 9 and 10. A cradle 18 is fixed rigidly to hollow shaft 113 so that it rotates with the shaft. The hollow shaft 113 is located in a bearing 22 on the side plate 11 by a snapring 114. The lever 19 is pivotally mounted by pin 20 on the lower end of cradle 18. The pin 21 pivotally connects the lever 19 with the inner shaft 13 to reciprocate the shaft inside the hollow shaft 113 when the lever 9 is operated to the left or to the right. The inner shaft 13 rotates with the hollow shaft 113 and cradle 18 through connecting pins 20 and 21 when lever 19 is moved frontward or backward. The inner shaft extends inwardly to the crank arm 23 which is fixed rigidly to the end of the inner shaft 13. When the inner shaft 13 rotates on its axis, the crank arm 23 also rotates with the shaft.

The crank arm 23 has a circular end 24 which extends downwardly to the shift rails 14 and 15. The crank arm 23 can be selectively positioned in the slots 25 and 26 of the collars 27 and 28 fastened to the shift rails 14 and 15. Each collar shifts the shift rail on which it is carried to one of three positions, as shown by the detents 29 and 30. The detents have three positions defined by the recesses 31, 32 and 33 of the detent 29 or the recesses 133, 34 or 35 of the detent 30. An interlock 36 is automatically positioned in the recess 37 or 38 depending on which shift rail is moved. The interlock 36 will lock the one rail while the other rail is permitted to slide. The shift forks 9 and 10 are carried on the shift rails 15 and 14. The shift fork 9 and 10 form a sleeve portion 40 and 41 which are fastened to their respective rail by the set screws 42 and 43.

Figure 2:
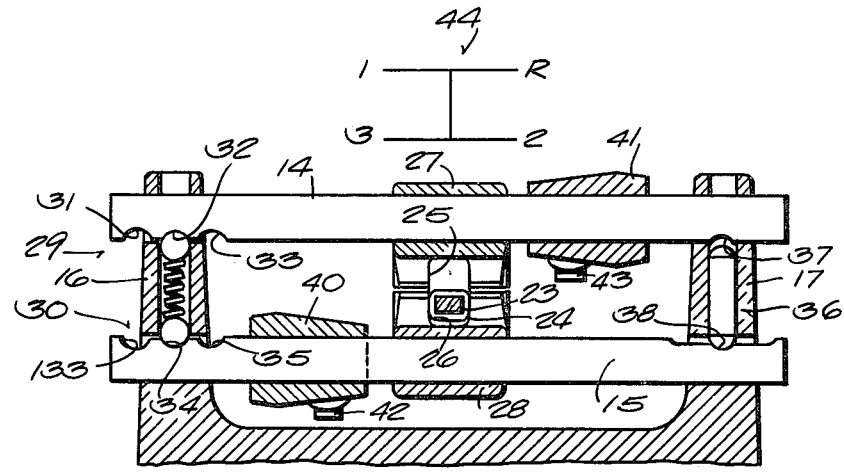
FIG. 2 shows a cross-section view of the shift rails and schematically illustrates the shifting positions of the shift rails.

The diagram 44 illustrates the shifted lever position of the transmission for the shift rails, as shown in FIG. 2.

The operation of the devise will be described in the following paragraphs.

Figure 3:
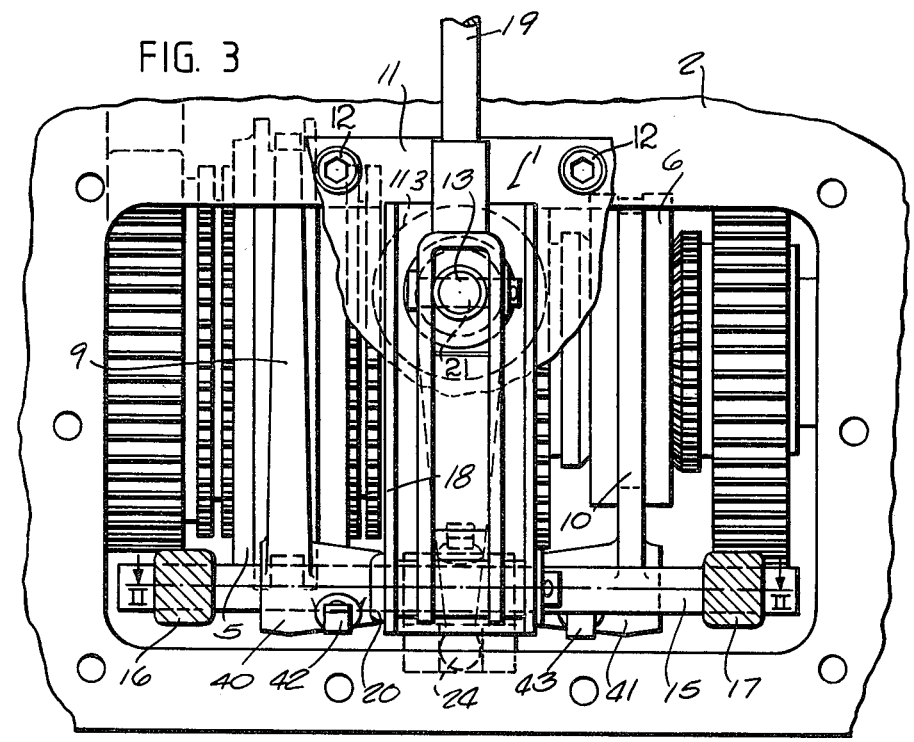
FIG. 3 illustrates a partial section side view of the side mounted shifting mechanism on the vehicle transmission.

As the shift lever 19 is pivoted to the extreme right-hand position or left-hand position as shown in phantom, the crank arm 23 is selectively positioned in slot 26 or 25. The lever 19 is pivotally supported on the pin 20 of the cradle 18 and pivotally connected through pin 21 in the inner shaft 13 to reciprocate the shaft or rotate the shaft about the axis of the shaft. For the purpose of illustration, consider the lever 19 pivoted in a clockwise direction as shown in FIG. 1. In this position, the crank arm 23 is in the slot 26 and the shift rail 15 is in a neutral position as shown in FIG. 2. As the lever is pivoted in a clockwise direction, as shown in FIG. 3, the shift rail 15 moves to the left carrying the shift fork 9 to shift the clutch sleeve 5. The transmission is then shifted into second gear as the detent 30 moves into the recess 35 and the interlock pin 36 is forced into the recess 37 to prevent shift rail 14 from moving. The transmission is shifted into the second gear ratio and the drive is carried through the respective gears 3 and 4 of the transmission.

When the transmission is shifted to neutral, the shift lever 19 is pivoted to the upright position, as shown in FIG. 3, and the shift rail 15 moves back to the neutral position as shown. The clutch sleeve 5 is shifted to neutral by the shift fork 9 and the transmission is in neutral. Accordingly, to shift the transmission into third gear the shift lever 19 would be rotated in a counterclockwise direction to shift the shift rail 15 to the righthand position.

In order to shift the transmission to first or reverse gears, the crank arm 23 must be pivoted into slot 25 by moving the shift lever to the phantom position, as shown in FIG. 1. The shift lever is then pivoted in clockwise or counterclockwise direction as desired by the operator to shift the transmission into first or reverse gear ratio. Likewise, shifting the transmission to neutral reverses the movement of the lever and the shift rail is returned to the neutral position, as shown in FIG. 2.

The connection joining the shift lever and the inner shaft 13 is a direct connection as is the connection between the inner shaft 13 and the crank arm 23. Accordingly, any movement of the shift lever for reciprocating or pivoting the inner shaft 13 provides a solid feel to the operator, since the shift lever 19 operates directly through the crank arm to the shift rails.

The embodiment of the invention in which an exclusive property or privilege is claimed are defined as follows:

1. A transmission shifting mechanism for shifting a transmission comprising, a transmission housing, a shaft having a crank arm reciprocally and pivotally mounted in said housing, shift rails slidably mounted for selective engagement by said crank arm responsive to reciprocal movement of said shaft, a shift lever mounted on said shaft for selectively reciprocating and pivoting said shaft to shift said vehicle transmission, a side cover on said transmission for supporting said shifting mechanism and said shift rails to allow complete removal of the shifting mechanism when said cover is removed from the transmission.

2. A transmission shift mechanism for shifting a transmission, as set forth in claim 1, including a cradle mounted on said shaft, means pivotally connecting said lever with said cradle.

3. A transmission shifting mechanism for shifting a transmission as set forth in claim 1 including shifting forks mounted on said shift rails for shifting said transmission.

4. A transmission shifting mechanism for shifting a transmission as set forth in claim 1 including means supporting said shift rails normal to said shaft.

5. A transmission shifting mechanism for shifting a transmission as set forth in claim 1 including means mounting said rails normal to said shaft whereby reciprocating said shaft selectively engages said rails.

6. A transmission shifting mechanism for shifting a transmission as set forth in claim 1 including a cradle fixedly connected to said shaft, means pivotally connecting said lever to said cradle.

7. A transmission shifting mechanism for shifting a transmission as set forth in claim 1 including means pivotally connecting said lever on said shaft in a common plane with said crank arm.

8. A transmission shifting mechanism for shifting a transmission as set forth in claim 1 including a cradle mounted on said shaft extending downwardly from said shaft, means pivotally connecting said lever to said cradle, means pivotally connecting said shaft to said lever, said lever thereby reciprocating said shaft through a transverse movement and pivoting said shaft by a longitudinal movement.

9. A transmission shift mechanism for shifting a transmission as set forth in claim 1 including means supporting said shaft transversely on said transmission, means supporting shift rails longitudinally on supporting structure on said cover, shift forks connected to said shift rails for shifting gears in said transmission, a cradle mounted on the end of said shaft pivotally supporting said shift lever to provide means for shifting said shifting mechanism.

10. A transmission shifting mechanism for shifting a transmission as set forth in claim 1 including at least two shift rails, detent means defining shift and neutral positions of each of said shift rails, interlock means between said shift rails permitting only one rail to be shifted at one time.

* * * * *